UNITED STATES PATENT OFFICE.

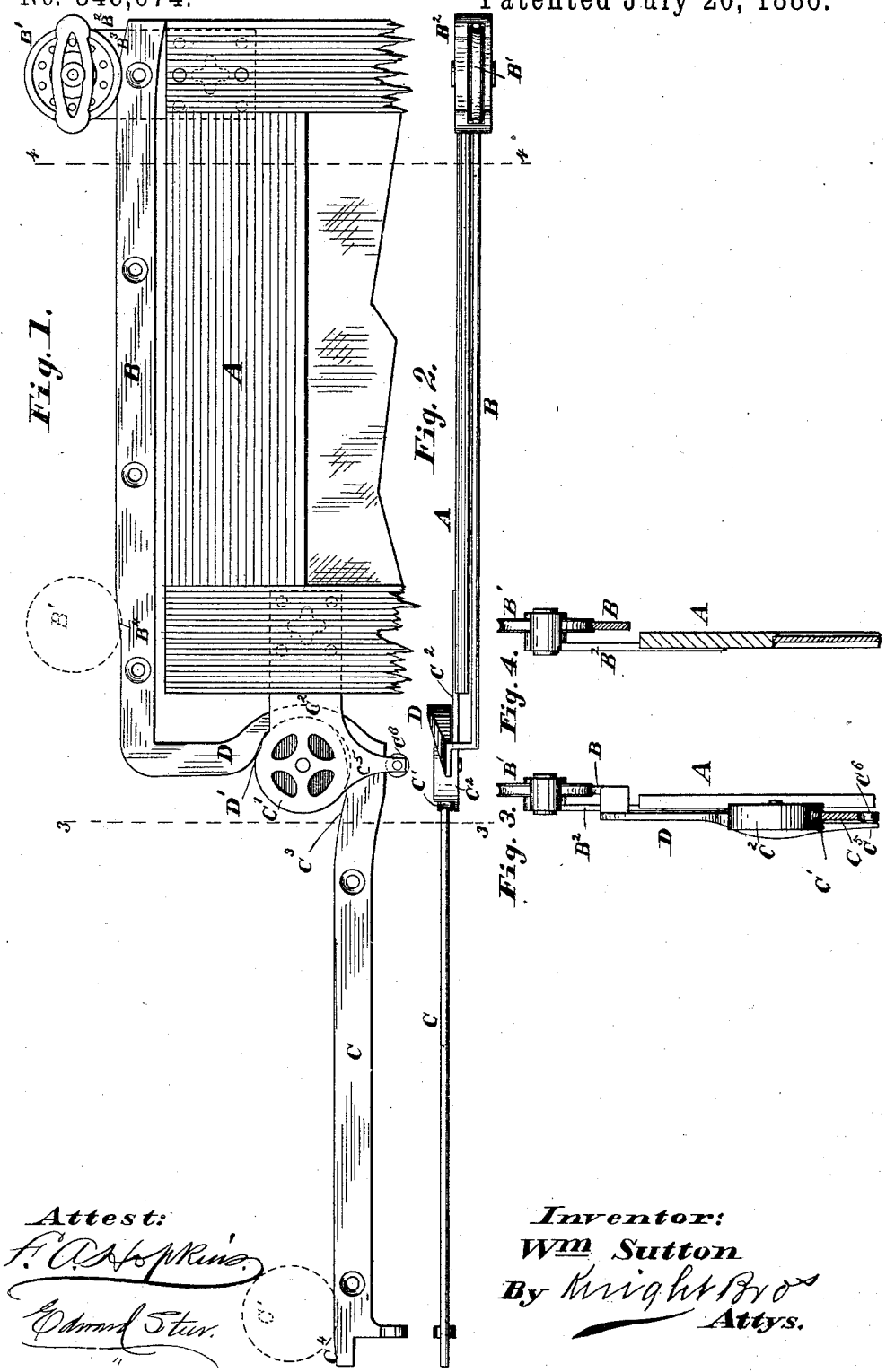

WILLIAM SUTTON, OF ST. LOUIS, MISSOURI.

HANGER FOR CAR-DOORS.

SPECIFICATION forming part of Letters Patent No. 346,074, dated July 20, 1886.

Application filed March 18, 1886. Serial No. 195,720. (No model.)

*To all whom it may concern:*

Be it known that I, WILLIAM SUTTON, of the city of St. Louis, in the State of Missouri, have invented a certain new and useful Improvement in Hangers for Car-Doors, of which the following is a full, clear, and exact description, reference being had to the accompanying drawings, forming part of this specification, and in which—

Figure 1 is a side view illustrating my invention, showing the upper end of the door. Fig. 2 is a top view of the same. Fig. 3 is a vertical section taken on line 3 3, Fig. 1. Fig. 4 is a similar view taken on line 4 4, Fig. 1.

My invention relates to an improved hanger, intended more particularly for street-car doors, but which may be used on other sliding doors; and my invention consists in features of novelty hereinafter fully described, and pointed out in the claims.

Referring to the drawings, A represents a part of a car door supported by and sliding upon a track, made in one piece, B D C. The parts B and C of the track are located in different vertical and horizontal planes, as shown in Figs. 1 and 2. The two parts are connected by a vertical arm, D, which is formed in one piece with the members B C, the parts B, C, and D being properly bent.

The door is supported on rollers B' and C', the roller B' working on the part B of the track, and the roller C' working on the part C of the track. The roller B' is connected to the top of the door by a suitable bracket, B², as shown, and the roller C' to the edge of the door near its upper end by a bracket, C², as shown. The member B of the track has an incline, B³, at its forward end, as shown in Fig. 1, and an incline, B⁴, at the other end. The member C of the track has a similar incline, C³, at one end, and C⁴ at the other end. The office of these inclines is to hold the door either in its closed or open position, the rollers B' C' (when the door is closed) bearing on the inclines B³ and C³, as shown in full lines in Fig. 1, and bearing on the inclines B⁴ C⁴, as shown in dotted lines in Fig 1, when the door is open.

The connecting-arm D of the track is preferably formed with a recess, D', as shown in Fig. 1, forming a bearing for the lower roller, C', when the door is closed.

With my improved hanger the door is securely and firmly supported, and can be conveniently and easily opened and closed.

The part C of the track being out of line with the part B, the door does not come in contact with the member C, while the rollers B' and C' are secured to the same side of the door.

The roller C is held down upon the track by an arm or extension, C⁵, on the bracket C² that extends downward and is bent over beneath the track, as shown in Figs. 1 and 3, and which may be provided with a roller, C⁶, that bears against the under side of the track.

I claim as my invention—

1. The combination of the door and track B C, made in one part, and rollers connecting the door to the track, substantially as shown and described.

2. The combination of the door, track B C, rollers connecting the door to the track, and connecting-arm D, made in one part with the track B C, substantially as set forth.

3. The combination of the door, track B C, and rollers connecting the door to the track, the two parts of the track having inclines at their respective ends, substantially as and for the purpose set forth.

4. The combination of the door, supporting-rollers, and the track, the track consisting of two members out of vertical and horizontal line with each other, substantially as and for the purpose set forth.

5. The combination of the door, supporting-rollers B' C', and track, the track consisting of two members, on which the rollers B' C' bear respectively, the roller C' being held upon the track by an extension, C⁵, of its bracket, substantially as set forth.

WM. SUTTON.

Witnesses:
SAML. KNIGHT,
BENJN. A. KNIGHT.